United States Patent

[11] 3,603,946

[72] Inventor Robert D. Lee
San Mateo, Calif.
[21] Appl. No. 887,698
[22] Filed Dec. 23, 1969
[45] Patented Sept. 7, 1971
[73] Assignee The United States of America as represented by the Administrator of the National Aeronautics and Space Administration

[54] TELEMETRY-ACTUATED SWITCH
12 Claims, 9 Drawing Figs.

[52] U.S. Cl. .......... 340/177, 325/492, 128/2.1 A, 307/252 F, 307/252 J
[51] Int. Cl. .......... G08c 15/00
[50] Field of Search .......... 340/177, 224; 325/492, 111, 113, 115, 118; 128/2.1 A; 343/227; 307/252 J–M

[56] References Cited
UNITED STATES PATENTS 3,321,644 5/1967 Calhoun .......... 307/252
3,409,786 11/1968 Nemeth .......... 307/252
3,469,114 9/1969 Bentley .......... 307/252
3,497,726 2/1970 Rice et al. .......... 307/252

*Primary Examiner*—John W. Caldwell
*Assistant Examiner*—Robert J. Mooney
*Attorneys*—Darrell G. Brekke and G. T. McCoy ABSTRACT: A silicon-controlled rectifier (SCR) provides either a high-impedance or a low-impedance electrical path between, for example, a power source and an instrument. While being switched from its high-impedance to its low-impedance state in response to a first control signal, this SCR is momentarily short-circuited by a transistor which is responsive to both the first control signal and a second control signal. During the momentary short-circuiting, an initial surge of current through a capacitor supplies enough current to the SCR to hold this SCR in its low impedance state. Decay of this current surge with the charging of the capacitor allows this SCR to be switched from its low-impedance to its high-impedance state by again momentarily short-circuiting its anode-to-cathode circuit in response to the second control signal.

INVENTOR.
ROBERT D. LEE

BY [signature]

[signature]

ATTORNEYS

INVENTOR.
ROBERT D. LEE

BY [signature]

ATTORNEYS

TELEMETRY-ACTUATED SWITCH

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to switches and in particular to passive switches which consume essentially zero power when off.

2. Prior Art

Telemetry-actuated switches are commonly used to turn on and off remote equipment, such as instruments in missiles, satellites, or remote weather stations. Such switches are also used to open doors, control lights, and to start machines such as pumps.

One requirement of all such switches is that they consume minimum power prior to actuation. Ideally, the power consumed by such switches, when off, should be zero. However, most switches consume a small amount of power due to leakage currents. Thus the lifetime of the system controlled by the switch is determined both by the power capacity of the battery used to actuate the switch and by the leakage current through the switch when it is supposedly off or "open." When this battery goes dead, the system no longer can be activated and the battery must either be replaced, if possible, or the system itself is useless.

In the area of biomedical instrumentation it is particularly desirable for the remotely actuated switch to consume minimum power. In this application, instruments for monitoring body functions are planted under the skin or in the organs of animals. Because of both the difficulty of implanting these instruments and the desirability of obtaining as much information as possible from the instrumented animals, the lifetime of these instruments should be as long as possible. To ensure this, the power consumed by the instrumentation must be minimized. This means that power consumed by the switch during the long periods between interrogation of the instruments must be as close to zero as possible.

Previously, one type of switch used in such biomedical instruments was actuated by physically orienting a magnet near the switch. However, if the animal accidentally passed near a metallic object, the magnetically actuated switch could be accidentally turned on, thus unintentionally draining power from the battery. A second type of switch consumed standby power when off. This limited battery and thus instrumentation life.

SUMMARY OF THE INVENTION

This invention overcomes these difficulties of the prior art by providing a passive switch, capable of being telemetry actuated, which when off (i.e. open circuited) draws essentially zero battery current. As a result, the lifetime of instrumentation activated by the switch is significantly increased relative to the lifetime of prior art instrumentation, while the possibility of accidental turn on, due to inadvertent proximity to metallic objects, is eliminated.

According to this invention, the same passive switch is used to both turn on or turn off the power supply to an instrument in response to a signal pulse transmitted to the switch. The switch includes a first bistable element which is driven from a high-impedance to a low-impedance state by a transmitted turn on signal. An initially high charging current drawn through this first bistable element by the charging of a capacitor ensures that this element remains in its low impedance state despite the momentary partial short-circuiting of this element by a circuit containing a second bistable element. The instrument remains on so long as the first bistable element conducts current from the power supply through the instrument back to the power supply.

Current flow to the instrument is shut off by pulsing the switch in the same identical manner as to turn on the switch. By this time, however, the capacitor in circuit relation to the first bistable element has been fully charged. Thus the current flowing through the first bistable element is sufficiently low that momentary partial short circuiting of the first bistable element switches this element from its low-impedance to its high-impedance state. This shuts off the current flowing from the power supply through the first bistable element to the instrument.

An alternative embodiment of this invention uses the current through the first bistable element to saturate a transistor. This transistor, normally off, then passes current to the instrument.

Another embodiment of this invention replaces the second bistable element with a timing circuit. This timing circuit contains a capacitor which is slowly charged through a large-valued resistor. When the voltage on the capacitor reaches a selected value, a unijunction transistor, the emitter of which is connected to the capacitor, is driven from the off to the on state. The capacitor discharges through the emitter-base path of the unijunction transistor. A transistor, connected to a resistor in the cathode circuit of the unijunction transistor, is saturated by the momentary turning on of the unijunction transistor. This transistor drives into saturation a second transistor which short circuits the first bistable element. Thus the first bistable element is driven from its low-impedance to its high-impedance state thereby shutting off the current flowing from the power supply through the first bistable element to the instrument.

The switching circuit of this invention consumes, when off, essentially zero power. Thus the instrument used with this switch has a long useful life.

DETAILED DESCRIPTION

While the switch of this invention will be described in conjunction with a biomedical instrument, this switch can, of course, be used to control the power supplied to a wide variety of instruments.

Figure 1:
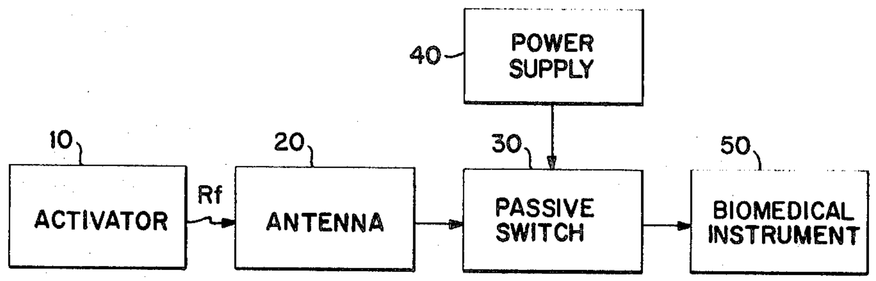
FIG. 1 is a block diagram of the various components of a biomedical instrumentation circuit with which the switch of this invention can be used.

As shown in FIG. 1, the biomedical instrumentation system incorporating this invention includes an antenna 20 which detects a signal pulse transmitted from activator 10. Antenna 20 is tuned, by means of a resonant circuit, to detect a signal containing frequency components within a selected range of frequencies. The output signal from antenna 20 activates passive switch 30 to close the circuit between power supply 40 and biomedical instrument 50, thereby allowing power to flow to biomedical instrument 50. Switch 30, and thus biomedical instrument 50, remains on until a second signal from activator 10 is received by tuned antenna 20. This second signal again activates passive switch 30, this time, however, to turn off switch 30 between power supply 40 and biomedical instrument 50, thereby turning off biomedical instrument 50.

Figure 2:
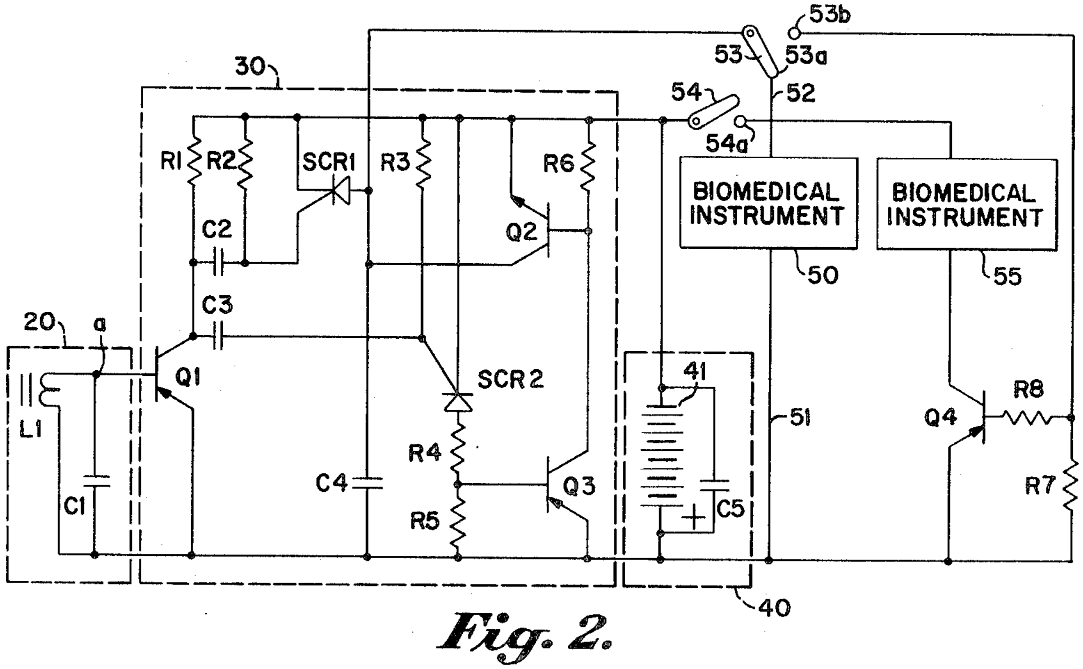
FIG. 2 shows two embodiments of the passive switch of this invention.

Antenna 20 and passive switch 30 are shown in more detail in FIG. 2. In the figures of this specification, the components will be numbered mnemonically; that is, all inductors will be denoted by the letter L followed by a number, all capacitors will be denoted by the letter C followed by a number, and all resistors will be denoted by the letter R followed by a number. Transistors will be labeled Q followed by their number while other elements will likewise be identified by an appropriate mnemonic letter or series of letters, followed by a number.

Thus, as shown in FIG. 2, antenna 20 is tuned by a parallel-connected tank circuit consisting of inductor L1 in parallel with tuning capacitor C1. The output voltage across this tank circuit reaches a maximum when the frequency of the input signal from activator 10 (FIG. 1) detected by inductor L1 is equal to or near the resonant frequency of the tank circuit.

In the absence of the receipt of a signal by antenna 20, the base of transistor Q1 is held, through coil L1, at the same potential as Q1's emitter. Consequently transistor Q1 is normally off.

Figure 3A:
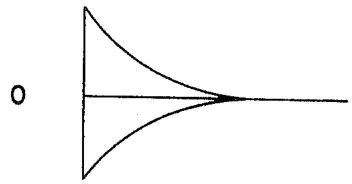
FIGS. 3*a*–3*f* show waveforms at selected points throughout the circuit shown in FIG. 2.
Figure 3B:
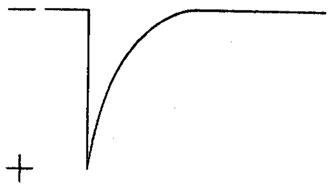

The receipt by antenna 20 of a signal possessing frequencies equal or close to the resonant frequency of the tank circuit produces a voltage across the tank circuit which is applied to the base of transistor Q1, turning Q1 on. FIG. 3*a* shows the envelope of the frequency pulse used to turn on transistor Q1. This pulse is typically a carrier signal with an exponentially decaying envelope. When Q1 is turned off, the back-biased emitter-base junction of Q1 acts as a high-impedance element. When the voltage pulse shown in FIG. 3*a* is applied at the base of Q1, labeled *a* in FIG. 2, transistor Q1 essentially behaves as a rectifying element passing to the collector only the amplified negative envelope of the signal received by inductor L1. The collector current passed by transistor Q1 charges capacitors C2 and C3, both of which initially contain zero charge. A portion of the current charging capacitor C2 becomes the gate current of SCR1. FIG. 3*b* shows the exponentially decaying negative collector voltage on transistor Q1 generated by the signal shown in FIG. 3*a* applied to the base of Q1.

Now a silicon-controlled rectifier, such as SCR1, when not conducting presents an extremely high impedance to a voltage source connected across its terminals. However, in response to a gate current, the impedance of a silicon-controlled rectifier changes from a very high value to a low value, and thus the device conducts a current when a voltage source is connected across its terminals. Once the device switches from its nonconducting to its conducting state, the gate becomes inactive and has no effect on the current flowing from the cathode to the anode of the device. Rather, this cathode-to-anode current must drop below some minimum holding current before the silicon-controlled rectifier will again switch from its low-impedance to its high-impedance state. Silicon-controlled rectifiers are well known in the electronic arts and are described, for example, in the SCR Manual, Fourth Edition, published by General Electric Company, 1967. These devices thus will not be described in detail in this specification.

The gate current to SCR1, which passes through Q1 and C2, turns SCR1 on. Thus current now flows from battery 41 through capacitor C4, initially containing zero charge, back through SCR1 to the negative terminal of battery 41. Current also flows from battery 41 through lead 51 to biomedical instrument 50 and then through lead 52, closed switch 53 contacting node 53*a*, and SCR1 back to the negative terminal of battery 41. Thus the switching of SCR1 from its high-impedance to its low-impedance state allows power from battery 41 to pass to, and activate, biomedical instrument 50.

A portion of the collector current from transistor Q1 also passes through capacitor C3. Some of this current returns through resistor R3 to the negative terminal of battery 41; but a portion of this current likewise flows through the gate electrode of SCR2 thereby switching this silicon-controlled rectifier from its high-impedance to its low-impedance state. Consequently, current from battery 41 flows through resistors R4 and R5 and SCR2 to the negative terminal of battery 41. The voltage drop across resistor R5 lowers the base voltage on PNP transistor Q3 sufficiently to turn on transistor Q3. The collector current of Q3, which passes through resistor R6, then raises the base voltage of NPN transistor Q2 above its emitter voltage by the voltage drop across resistor R6. This turns on and saturates transistor Q2. Transistor Q2 thus partially short circuits SCR1's anode-to-cathode circuit.

However, the turning on of transistor Q2 is only momentary. Indeed, transistor Q2 is turned on only while transistor Q3 conducts. Upon the charging of capacitor C3, the gate current to SCR2 terminates. Resistors R4 and R5 are sufficiently large that the anode-to-cathode current through SCR2 is below its minimum holding current. Consequently, in the absence of gate current, SCR2 turns off. In response thereto, transistor Q3 likewise turns off, turning off transistor Q2. But the momentary drawing through transistor Q2 of a portion of the current initially passing through SCR1 does not turn off SCR1. Rather, the initial current charging capacitor C4, shown in FIG. 3*e*, is sufficiently large to not only supply the collector current of transistor Q2 but also to supply more than the minimum holding current of SCR1. In other words, the time during which the anode-to-cathode circuit of SCR1 is shorted is not long enough to sweep clean all the electrons within its anode-to-cathode semiconductor layers.

The signal pulse activating transistor Q1 is, as shown in FIG. 3*a*, relatively short lived. Capacitors C2 and C3 are quite small compared to capacitor C4. When C2 and C3 are fully charged, the gate currents on SCR1 and SCR2 terminate. But because capacitor C4 is still charging when these gate currents terminate, and because the current drawn through SCR1 from power supply 40 by instrument 50 is greater than SCR1's minimum holding current, SCR1 remains on, providing a closed switch between power supply 40 and biomedical instrument 50. Thus biomedical instrument 50 remains on. Capacitors C2 and C3 however, quickly discharge through resistors R1, R2 and R3.

Figure 3C:
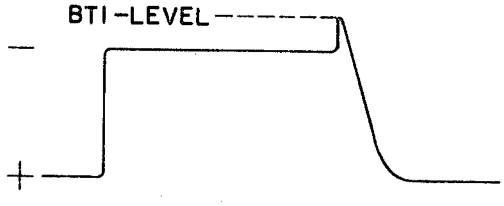
Figure 3E:
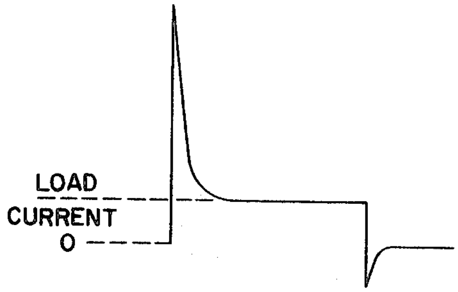

FIG. 3*c* shows the anode voltage on SCR1. Originally at the positive voltage of battery 41 because capacitor C4 is uncharged, this voltage drops to the anode voltage of SCR1 when SCR1 switches from its high-impedance to its low-impedance state. This anode-to-cathode voltage is just the forward bias voltage of a PN junction, about 0.7 volts.

Figure 3D:
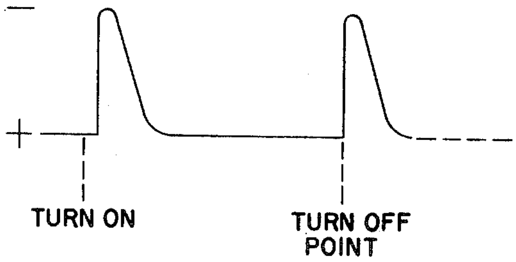
Figure 3F:
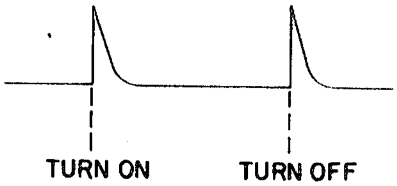

The anode voltage on SCR2 is shown in FIG. 3*d*. Dropping momentarily from the positive voltage of battery 41 in response to SCR2's gate current passing through capacitor C3, this anode voltage reaches about 0.7 volts above the negative potential of battery 41. But the gate current of SCR2 drops to zero with the charging of capacitor C3. SCR2 then switches back to its high-impedance state due to the fact that the current through SCR2, shown in FIG. 3*f*, is beneath the minimum current necessary to hold SCR2 in its low-impedance state.

To turn off biomedical instrument 50, a second signal pulse, identical to the pulse used to turn on switch 30, is applied to antenna 20. Transistor Q1 again turns on providing collector current for charging both capacitors C2 and C3. The charging current through capacitor C3 turns on SCR2 as before, again turning on transistors Q3 and Q2. Transistor Q2 saturates and partially short circuits the anode-to-cathode circuit of SCR1. Although gate current initially is provided to SCR1 by the charging of capacitor C2, because SCR1 is already turned on, its gate is inactive and thus this charging current has no effect on SCR1. Capacitor C4 is now fully charged and draws no current. Thus the short-circuiting of SCR1 by transistor Q2 lowers the anode-to-cathode current of SCR1 below its holding current and turns off SCR1. When SCR1 switches off, no current flows from battery 41 to biomedical instrument 50. Upon completion of the charging of capacitor C3, SCR2 likewise again switches off as before, turning off transistors Q3 and Q2. As a result, all semiconductor devices, including SCR1, have reverted to their off states and no path exists for current flow through the passive electronic switch. Capacitor C4 discharges through instrument 50. The switch is now ready to be activated by another signal pulse transmitted to antenna 20.

When passive switch 30 is closed, i.e. on, the only power dissipated in the switch is in the SCR1 anode-to-cathode circuit because all the other active components in the switch have returned to their off condition. Consequently the circuit is an extremely efficient switch dissipating only small amounts of power during its on state. During its off state, the only power dissipated is due to leakage currents. These currents, on the order of 4 to 10 nanoamps, are extremely small. No standby power is consumed by the switch.

It should be noted that when passive switch 30 is on, that is conducting, SCR1 sustains a voltage drop of 1 PN diode, approximately 0.7 volts. Typically, battery 41 will have a voltage potential greater than 3 volts DC. This circuit is thus particularly useful when both the voltage drop across SCR1 and battery voltage and size are not critical. But when these parameters are critical, especially when a voltage source of 2.7 volts DC is used, as occurs when two 1.35 volt mercury cells are used, then a modification of the circuit of FIG. 2 can be used.

By closing switch 54 in FIG. 2 and by changing two-pole switch 53 from contact with node 53*a*, as shown, to contact node 53*b*, thereby to open circuit biomedical instrument 50 and place in the circuit a low-voltage biomedical instrument 55, a second embodiment of this invention is obtained. The passive switch works as described above with the following modifications. When SCR1 latches on and switches from its high-impedance to its low-impedance state, the current through SCR1 from battery 41 passes through the parallel combination of resistor R7 and resistor R8 connected in series with the base-emitter junction of Q4, switch 53, and back through SCR1 to the negative terminal of battery 41. The voltage drop across resistor R7 is such as to drive PNP transistor Q4 into saturation. Transistor Q4 then conducts current from battery 41 through low-voltage biomedical instrument 55 back to the negative terminal of battery 41. Because transistor Q4 is saturated, its base-emitter and base-collector PN junctions are both forward biased. Consequently the voltage drop across transistor Q4 is not the 0.7 volts associated with a forward-biased PN junction, but rather is a much smaller voltage, typically the 0.1 to 0.2 volts associated with the internal resistances of the saturated transistor. Transistor Q4 continues to conduct so long as SCR1 conducts sufficient current through resistors R7 and R8 to hold SCR1 in its low-impedance state. Resistors R7 and R8 are selected to allow the base current of transistor Q4 plus the current through resistor R8 to be greater than the holding current for SCR1. This option of selecting the values of resistors R7 and R8 allows a great versatility in selecting the voltage of battery 41 and minimizing the internal power consumption of the switch. It should be noted however, that the embodiment just described dissipates power not only in SCR1 but also in resistors R7 and R8. However, the voltage across low-voltage biomedical instrument 55 approaches more closely the voltage of battery 41 than in the earlier described embodiment.

While the embodiments of this invention have been described using transistors of a given type, it should be understood that this circuit can be constructed with opposite type transistors provided the bias voltages are appropriately rearranged.

The circuits shown in FIG. 2 were constructed using the following component values:

| | | | |
|---|---|---|---|
| L1 | 120 $\mu h$ | R1 | 56K |
| Q1 | 2N4250 | R2 | 220K |
| Q2 | 2N5134 | R3 | 220K |
| Q3 | 2N4250 | R4 | 15K |
| Q4 | 2N4250 | R5 | 33K |
| C1 | 390 pf. | R6 | 56K |
| C2 | 0.01 $\mu$f. | R7 | 3.9K |
| C3 | 0.01 $\mu$f. | R8 | 2.7K |
| C4 | 6.8 $\mu$f. | SCR1 | 2N4096 |
| C5 | 0.001 $\mu$f. | SCR2 | 2N4096 |

R3 is selected at time of fabrication to ensure correct operation of the circuit despite the wide variation in the parameters of SCR2. R3 can, in some cases, be as low as 10K.

Figure 4:
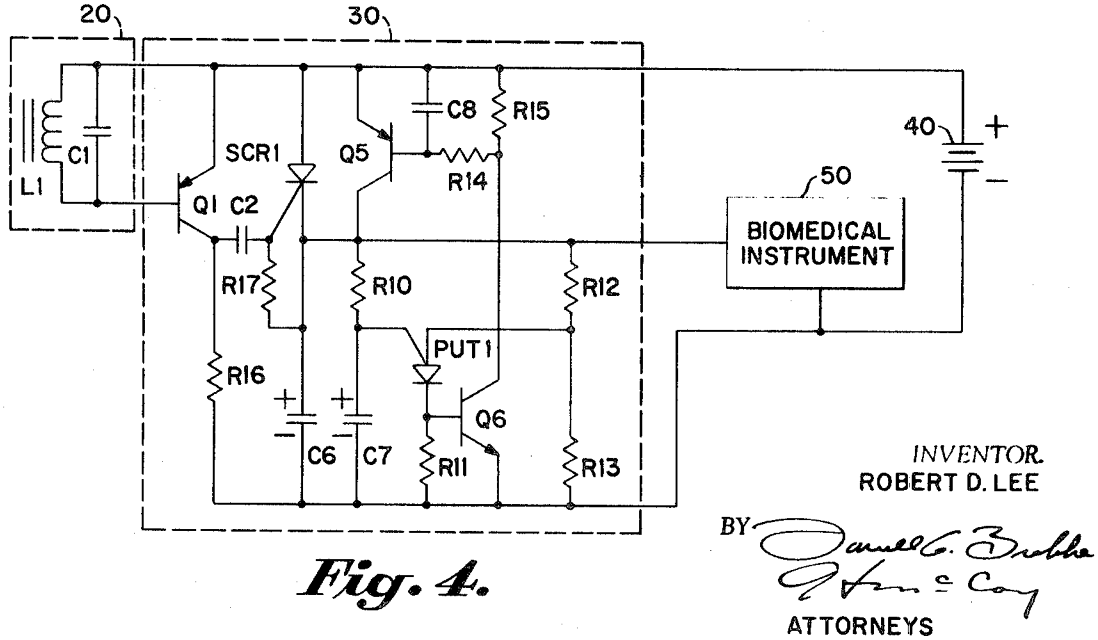
FIG. 4 shows a third embodiment of the passive switch of this invention.

A third embodiment of this invention is shown in FIG. 4. Antenna 20 operates as described above in conjunction with the description of the embodiments shown in FIG. 2. Transistor Q1 is initially biased off by connecting the base of Q1 through inductor L1 through the emitter of transistor Q1. SCR1 is also biased in the off state as are transistors Q5 and Q6. Thus, initially no current paths exist within the switch and the power consumed by this switch in the off state is essentially the power dissipated by leakage currents.

When a pulse is transmitted from activator 10 (FIG. 1), this pulse is detected by antenna 20. The voltage produced across capacitor C1 turns on transistor Q1. Q1's collector current passes through both resistor R16 and capacitor C2, connected to the gate electrode of SCR1. The current passing through and charging capacitor C2 is sufficient to turn on SCR1. This allows capacitor C6 to charge to the potential of battery 41. The initial flow through SCR1 is extremely large due to the unimpeded charging of capacitor C6. This enhances the turn-on of SCR1. When SCR1 is turned on, current flows through SCR1 from battery 40 to biomedical instrument 50, thereby turning on this instrument.

Simultaneous with the turning on of SCR1, the electric timer circuit, consisting of resistors R10, R11, R12, and R13, capacitor C7, and programmable unijunction transistor 1 (hereafter PUT1) is turned on. Thus part of the anode-to-cathode current through SCR1 passes through resistor R10 and charges capacitor C7. Connected to the anode between resistor R10 and capacitor C7, is the emitter of programmable unijunction transistor 1. A programmable unijunction transistor is a device which switches from the low-current to the high-current state in response to an increase in voltage on its emitter terminal above a minimum peak voltage. A typical unijunction transistor has three terminals, one called the emitter, and two called base-one and base-two. Between the two base terminals, the unijunction transistor has the characteristics of an ordinary resistance. When the voltage on the emitter exceeds a given value, the resistance between the emitter and base-one is very high and only a small leakage current flows. When the emitter voltage exceeds a specified value, however, the resistance between the emitter and base-one drops to a very low value and the emitter current is limited primarily by the external resistance in the emitter base-one circuit.

Thus in FIG. 4, when the voltage on PUT 1's emitter, shown as connected to the node between resistor R10 and capacitor C7, exceeds a given value, PUT1 conducts a current. The voltage drop of this current across resistor R11 drives transistor Q6 into saturation. The collector current of transistor Q6 across resistors R15 and R14 in turn drives transistor Q5 into saturation. When transistor Q5 is saturated, its collector to emitter voltage becomes approximately 0.2 volts, the voltage associated with the internal resistances of the device. This essentially short circuits SCR1 thereby forcing SCR1 from the low-impedance to the high-impedance state and thus shutting off the power to biomedical instrument 50. Capacitor C8 ensures that the base voltage on transistor Q5 remains sufficiently beneath the emitter voltage of this transistor to keep transistor Q5 saturated sufficiently long to drive SCR1 from its low-impedance to its high-impedance state. The time necessary for PUT1 to be driven on is determined by the value of resistor R10 and capacitor C7. When C7 is approximately 100 microfarads and R10 is 4.7 megohms, it takes approximately 7 minutes for PUT1 to be driven on. Thus biomedical instrument 50 is on for about 7 minutes after the initial turn-on pulse is received until PUT1 automatically pulses biomedical instrument 50 off again. The voltage at which PUT1 is turned on is controlled by selecting the values of voltage divider resistors R12 and R13. This voltage divider essentially controls the voltage on base-two of PUT1.

The circuit shown in FIG. 4 is substantially the same as the circuit shown in FIG. 2 except that the turnoff pulse is internally, rather than externally, generated. This automatically prevents unwanted power dissipation due to failure to transmit a turnoff pulse.

The circuit shown in FIG. 4 was constructed with the following component values:

| | | | |
|---|---|---|---|
| Q1 | 2N4250 | R16 | 18K |
| Q6 | 2N5134 | R17 | 220K |
| Q5 | 2N4250 | R10 | 4.7 Meg |
| SCR1 | 2N4096 | R14 | 220 |
| PUT1 | D13T2 | R15 | 5.6K |
| | | R11 | 100 |
| C1 | 390 pfl | R12 | 1 Meg |

| | | | |
|---|---|---|---|
| C2 | 0.01 $\mu$f. | R13 | 1 Meg |
| C6 | 10 $\mu$f. | | |
| C7 | 100 $\mu$f. | L1 | 120 $\mu$h. |
| C8 | 0.01 $\mu$f. | | |

What is claimed:

1. A switch comprising;

a first bistable element for providing either a high-impedance or a low-impedance electrical path;

means for switching said bistable element from its high-impedance to its low-impedance state in response to a first control pulse;

means responsive to both said first control pulse and a second control pulse for short circuiting said bistable element thereby to drive said bistable element from its low-impedance to its high-impedance state; and means for maintaining a surge of current through said bistable element for a selected period when said bistable element is being switched from its high-impedance to its low-impedance state, thereby to hold said bistable element in its low-impedance state despite the momentary partial short-circuiting of said bistable element by said means for short circuiting.

2. Structure as in claim 1 wherein said first bistable element comprises a first silicon-controlled rectifier.

3. Structure as in claim 2 wherein said means for switching said first bistable element comprises;

means for receiving a transmitted signal;

means for producing said first control pulse from said transmitted signal; and means for applying said first control pulse to the gate of said first silicon-controlled rectifier thereby to switch said silicon-controlled rectifier from its high-impedance to its low-impedance state.

4. Structure as in claim 3 where said means for shorting said first bistable element comprises;

a second silicon-controlled rectifier responsive to both said first and said second control pulses;

at least two impedance elements connected in series with the anode-to-cathode circuit of said second silicon-controlled rectifier to maintain its anode-to-cathode current beneath the minimum holding current necessary to maintain this second silicon-controlled rectifier in its low-impedance state in the absence of said first and second control pulses; and, means responsive to current through the anode-to-cathode circuit of said second silicon-controlled rectifier to partially and momentarily short circuit said first silicon-controlled rectifier.

5. Structure as in claim 4 where said means responsive to current through the anode-to-cathode circuit of said second silicon-controlled rectifier comprise;

a first transistor, the base of which is connected at the node between said at least two impedance elements, the collector of which is connected through a resistor to a power supply, and the emitter of which is connected to the other terminal of said power supply; and a second transistor the base of which is connected to the node between the collector of said first transistor and said resistor, and the emitter and collector of which are connected across the anode-to-cathode circuit of said first silicon-controlled rectifier, said second transistor being driven into saturation by the collector current through said first transistor, thereby to partially short circuit said first silicon-controlled rectifier during the period said second silicon-controlled rectifier conducts current.

6. Structure as in claim 5 wherein said means for maintaining a surge of current through said first bistable element for a selected period comprises;

current storing means connected in series with the anode-to-cathode circuit of said first silicon controlled rectifier and said power supply, said current storage means drawing a large current when said first bistable element is switched from its high-impedance to its low-impedance state, but said current storing means drawing no current when said first bistable element is switched from its low-impedance to its high-impedance state.

7. Structure as in claim 1 including in addition a selected instrument connected to said power supply by said first bistable element.

8. Structure as in claim 1 including;

a third transistor for interconnecting a power supply and an instrument; and, means responsive to current through said first bistable element for driving said third transistor into its saturated state, thereby to provide through said transistor a low-impedance path between said power supply and said instrument.

9. A telemetry-actuated switch for connecting a power supply to an instrument, said switch comprising;

a first bistable element for providing either a high-impedance or a low-impedance electrical path between said power supply and said instrument;

means for switching said bistable element from its high-impedance to its low-impedance state in response to a first control signal;

means responsive to both said first control signal and a second control signal for momentarily and partially short-circuiting said bistable element thereby to drive said bistable element from its low-impedance to its high-impedance state;

means for maintaining a surge of current through said bistable element for a selected period when said bistable element is being switched from its high-impedance to its low-impedance state, thereby to hold said bistable element in its low-impedance state despite the momentary partial short-circuiting of said bistable element by said means for short-circuiting; and, means for generating said first and second control signals from first and second transmitted signals.

10. A telemetry-actuated switch for connecting a power supply to an instrument, said switch comprising;

a first bistable element for providing either a high-impedance or a low-impedance electrical path between said power supply and said instrument;

means for switching said bistable element from its high-impedance to its low-impedance state in response to a first control signal;

means responsive to said first control signal for generating a second control signal after a predetermined time from the receipt of said first control signal;

means responsive to said second control signal for momentarily short-circuiting said first bistable element thereby to drive said first bistable element from its low-impedance to its high-impedance state.

11. Structure as in claim 10 in which said means responsive to said first control signal comprise;

a resistor and a capacitor connected in series, with said first bistable element such that when said first bistable element switches from its high to its low-impedance state a current flows through said capacitor thereby to charge said capacitor, a unijunction transistor the emitter of which is connected to the node between said resistor and capacitor, such that when the voltage across said capacitor rises to exceed a selected minimum value, said unijunction transistor is turned from its off to its on state, and a voltage divider network consisting of two resistors, the base of said unijunction transistor being connected to the node between said two resistors.

12. Structure as in claim 11 in which said means responsive to said second control signal comprises;

a first and a second transistor driven into saturation by said second control signal, said first transistor shorting said first bistable element thereby to drive said first bistable element from its low- to its high-impedance state.